United States Patent [19]
Martin

[11] Patent Number: 5,437,151
[45] Date of Patent: Aug. 1, 1995

[54] DETECTING AND CONTROLLING SUPERSONIC AIRFLOW NORMAL SHOCK PATTERN POSITION IN AN AIRCRAFT JET ENGINE ASSEMBLY

[75] Inventor: Anthony N. Martin, Simsbury, Conn.

[73] Assignee: United Technologies Corporation, Windsor Locks, Conn.

[21] Appl. No.: 109,878

[22] Filed: Aug. 20, 1993

[51] Int. Cl.⁶ .................. F02C 7/042; F02C 7/057
[52] U.S. Cl. ..................... 60/233; 60/39.29; 137/15.2
[58] Field of Search .............. 60/39.24, 39.27, 29.39, 60/233, 237, 240; 137/15.1, 15.2; 73/118.2

[56] References Cited

U.S. PATENT DOCUMENTS

| | | | |
|---|---|---|---|
| 3,533,238 | 10/1970 | Marvin | 137/15.2 |
| 3,911,260 | 10/1975 | Dustin | 137/15.2 |
| 5,072,612 | 12/1991 | Iverson et al. | 73/118.2 |

Primary Examiner—Louis J. Casaregola

[57] ABSTRACT

The position of the normal airflow shock pattern in the airflow inlet of a supersonic aircraft jet engine assembly is detected by a light beam position sensor assembly. A narrow band coherent source light beam is angularly transmitted across the engine assembly airflow inlet and is angularly refracted by the normal shock pattern. A bank of light beam sensor assemblies is mounted on the airflow inlet so as to detect the position of the refracted light beam relative to the leading surface of the power section of the engine. Selectively adjustable airflow control tabs are mounted on the engine assembly and are operably connected to an airflow inlet controller. The airflow inlet controller monitors ambient flight conditions and the location of the refracted light beam, and will selectively adjust the position of the airflow control tabs so as to maintain the position of the normal shock pattern at a calculated desired distance from the leading surface of the engine power section.

10 Claims, 3 Drawing Sheets

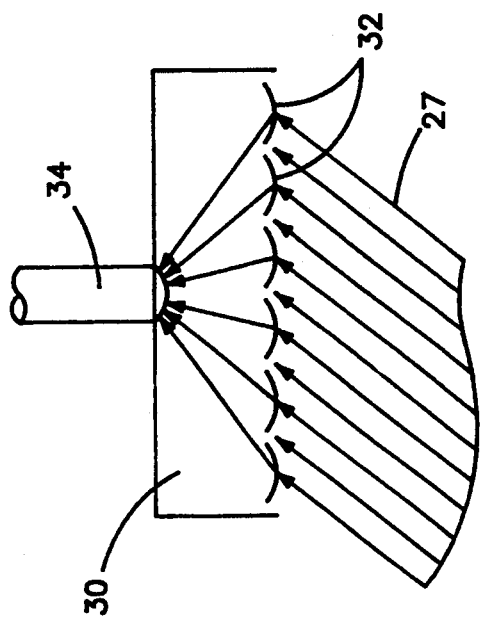
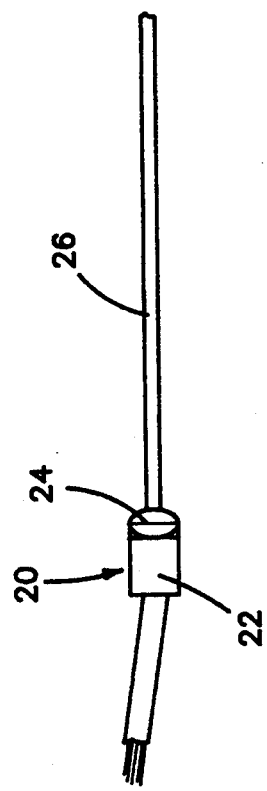
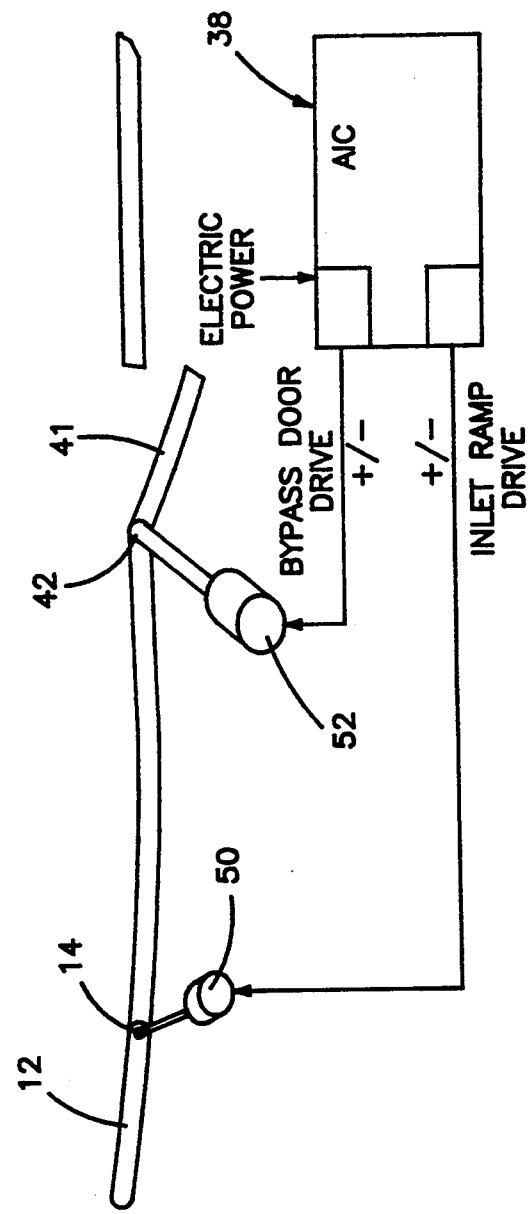
FIG-3
FIG-2
FIG-5

DETECTING AND CONTROLLING SUPERSONIC AIRFLOW NORMAL SHOCK PATTERN POSITION IN AN AIRCRAFT JET ENGINE ASSEMBLY

TECHNICAL FIELD

This invention relates to supersonic aircraft jet engine assemblies, and more particularly to a system and method for sensing and controlling the position of the normal supersonic airflow shock pattern in the air inlet section of the engine assembly.

BACKGROUND ART

In order for modern jet aircraft engines to operate when the aircraft is traveling at supersonic speeds, the stream of air entering the power section of the engine assembly must be maintained at a target subsonic velocity and pressure. The target subsonic velocity and pressure for any particular flight mode will vary from mode to mode whereby it is desirable to positively control such target variations. In addition, changes in ambient flight conditions which may occur during a particular flight mode may result in unintentional changes in the subsonic airstream power section entry velocity and pressure, which unintentional changes must be corrected in order to maintain proper operation of the aircraft.

When the aircraft is traveling at supersonic speeds, the air mass entering the aircraft engine assembly attempts to initially "be moving" at the same supersonic air speed as the aircraft. The engine assembly includes an air inlet section into which an ambient airstream moves, which ambient airstream is directed to the propulsion or power section of the engine assembly. As the air stream enters the air inlet section, a series of shock patterns are created in the flowing air mass. The shock patterns are essentially discontinuities in air pressure, temperature, and density which occur at various angles to the direction of movement of the air mass into the air inlet section, and which are influenced by the geometry of the air inlet structure and the ability of the engine to utilize the air mass in generating thrust. These shock patterns will form obliquely to the path of travel of the air mass toward the engine power section, with the shock pattern most proximal to the engine power section being substantially normal or perpendicular to the path of travel of the air mass.

As previously noted, the air mass will enter the engine assembly air inlet section at supersonic speeds which essentially match the air speed of the aircraft, and as the air mass moves through each of the shock patterns, the air mass velocity will diminish while its pressure and density increases. By the time that the air mass moves beyond the normal shock pattern, its velocity will have been reduced to a subsonic speed so that it enters the engine assembly power section at a subsonic speed. The ideal air inlet configuration will provide a maximum pressure and density for the air mass at the engine face. These ideal parameters require ideal positioning of the shock patterns. This can be achieved through variation and control of the air inlet geometry. A critical parameter in achieving ideal pressure and density parameters is the distance between the normal shock pattern and the engine assembly power section face.

As previously noted, variations in ambient air conditions, as well as aerial maneuvers of the aircraft at supersonic speeds, can cause the normal shock pattern to move toward or away from the power section. When this happens, the velocity, pressure and density of the air mass entering the power section will change unintentionally. The result can be inefficient or even ineffective operation of the engine. If the position of the normal shock pattern relative to the engine power section can be monitored and controlled, several beneficial results will be obtained. First of all, when the air mass velocity, pressure and density entering the power section should be altered in order to produce maximum efficiency in engine operation for any particular supersonic flying mode, i.e., climbing, accelerating, cruising, decelerating, or the like, such alterations could be achieved by selectively causing the normal shock pattern to move toward, or away from the power section, as the case may be. Secondly, when unintentional shifting of the normal shock pattern relative to the engine power section occurs, corrections could be made to maintain optimal power section air mass entry velocity, pressure and density.

DISCLOSURE OF THE INVENTION

This invention relates to a method and system for monitoring the position of the normal shock pattern relative to the engine power section entry, and for selectively changing the distance between the power section entry and the normal shock pattern by shifting the latter toward or away from the former.

The location of the normal shock pattern is detected and monitored by directing a light beam obliquely across the air inlet section of the engine assembly. The light beam will be refracted by the normal shock pattern as the light beam passes through the latter so as to bend the light beam. The light beam's path of travel after leaving the normal shock pattern will be rectilinear. A series of discrete light beam collectors are positioned in the air inlet section so as to be selectively impinged by the refracted light beam after it emerges from the normal shock pattern. The light collectors are connected to discrete photodetectors forming a part of an air inlet controller assembly. The controller assembly includes a programmed microprocessor which is preprogrammed with optimal normal shock pattern positions for a variety of flight modes, existing ambient air conditions and engine power settings. The photodetectors are operably connected to the microprocessor so as to transmit signals to the microprocessor which specify the position of the normal shock pattern within the air inlet section of the engine assembly.

The air inlet section is provided with angularly deflectable tabs or ramps which can alter certain characteristics of the flow path of the air mass moving from ambient surroundings into and through the air inlet section. These tabs can be selectively moved in such a manner as to alter ambient air impingement points at the air inlet section, and/or to alter the air pressure within the air inlet section. Such air inlet section parameter alterations will result in changes in the locations of the various shock patterns, and ultimately, the location of the normal shock pattern relative to the power section entry. The tabs are actuated by pneumatic, hydraulic or electrical assemblies which are operably connected to the air inlet controller microprocessor. The microprocessor is preprogrammed to change tab positions so as to result in known positioning of the normal shock pattern, taking into account the existing flight conditions which are fed into the microprocessor. The microprocessor is connected to the tab actuating assemblies and is operable to transmit deflection signals to the actuating assemblies based on the incoming signals from the normal shock pattern photodetectors. When a photodetector signal indicates a need to relocate the normal shock pattern, the controller will transmit appropriate tab deflecting signals so that the tabs will be repositioned so as to move the normal shock pattern to its desired position within the air inlet section of the engine assembly.

It is therefore an object of this invention to provide a system and method for detecting and monitoring the location of a normal shock pattern in the air inlet section of an engine assembly in a supersonic aircraft.

It is a further object of this invention to provide a system and method of the character described which can selectively control the location of the normal shock pattern within the air inlet section.

It is an additional object of this invention to provide a system and method of the character described which monitors existing ambient flight conditions and positions the normal shock pattern location to conform to a target position preferred for the existing flight conditions.

It is another object of this invention to provide a system and method of the character described which detects unintentional movement of the normal shock pattern away from its target position, and which is operable to take corrective action to relocate the normal shock pattern to its target position.

These and other objects and advantages of this invention will be more readily apparent from the following detailed description of a preferred embodiment of the invention when taken in conjunction with the accompanying drawings, in which:

BRIEF DESCRIPTION OF THE DRAWINGS

FIG. 2 is a schematic side elevational view of the light beam emitter assembly of FIG. 1;

FIG. 3 is a schematic side elevational view of one of the light beam gathering or collecting assemblies of FIG. 1;

FIG. 5 is a schematic circuit diagram showing the manner in which the controller interacts with the tab position controls.

BEST MODE FOR CARRYING OUT THE INVENTION

Figure 1:
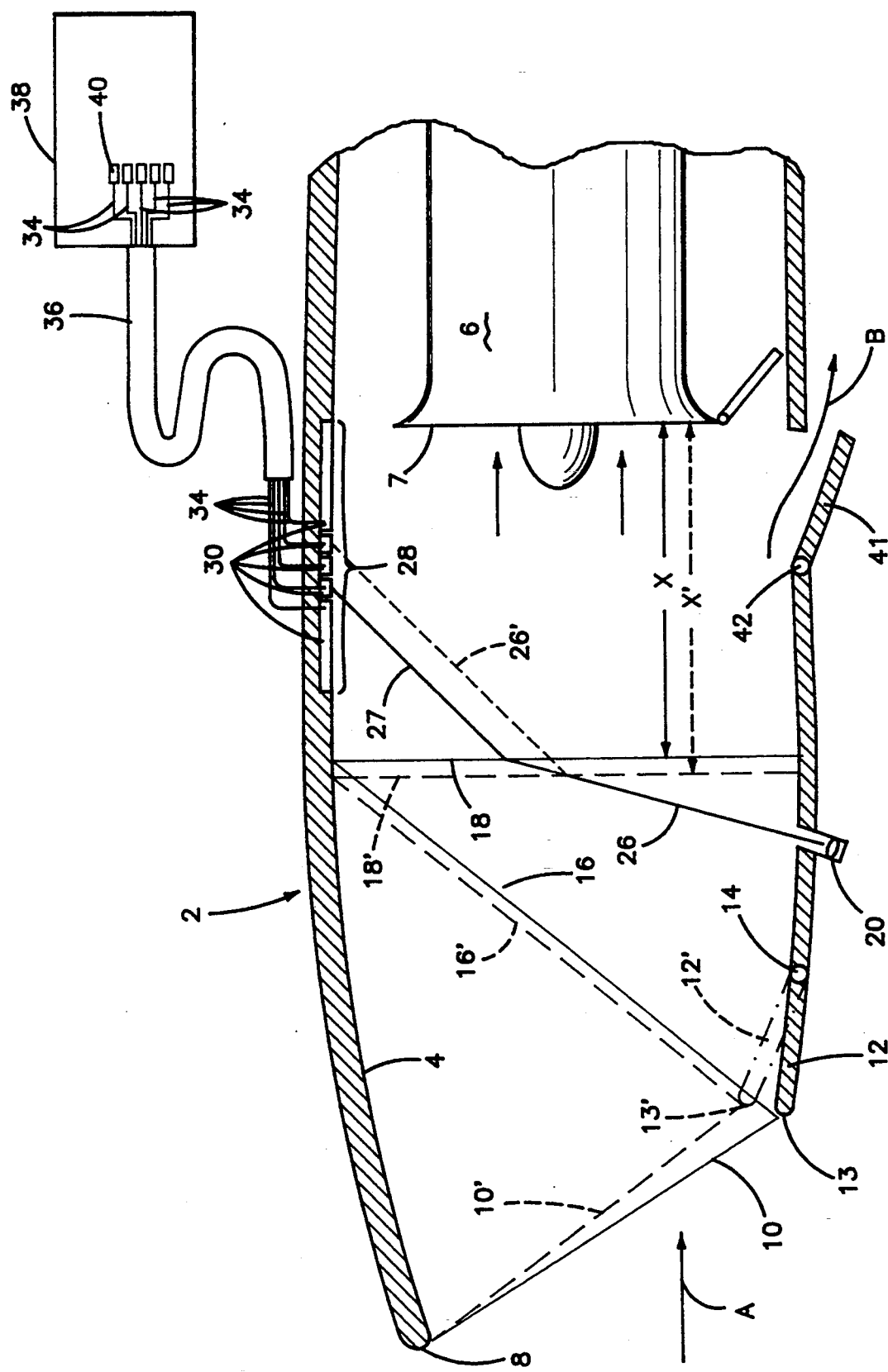
FIG. 1 is a fragmented sectional view of the air inlet section and the leading portion of the power section of a supersonic jet engine assembly formed in accordance with this invention.

Referring now to the drawings, there is shown in FIG. 1 a preferred embodiment of a supersonic aircraft engine assembly denoted generally by the numeral 2, which engine assembly has the normal shock pattern sensing and control system of this invention incorporated therein. The engine assembly 2 has an air inlet section 4 and a power section 6. As the aircraft moves through the ambient air mass at supersonic air speeds, which, for example would be on the order of Mach 2.4 at cruising mode, the oncoming airstream moves in the direction of the arrow A into the mouth of the air inlet section 4 at a velocity of Mach 2.4. The oncoming airstream impinging on the air inlet surface 8 creates an initial oblique shock pattern 10 which extends from the inlet surface 8 to the leading edge of an inlet tab or ramp 12 in the air inlet section 4. The ramp 12 is pivotally mounted on the air inlet section 4 via a hinge 14 so that its pitch relative to the oncoming airstream can be controllably altered. A second oblique shock pattern 16 results from the oncoming airstream impinging the leading edge 13 of the ramp 12; and the third shock pattern 18 which is normal to the direction of flow of the oncoming airstream, forms within the air inlet section 4. The shock pattern 18 is referred to herein as the "normal shock pattern". As previously noted, when the oncoming stream of air passes through each shock pattern 10, 16 and 18, the airstream velocity will be diminished. Thus, if the ambient air enters the air inlet section 4 at a speed of Mach 2.4, after passing through the normal shock pattern, its speed may be lowered to Mach 0.7, which is a typical desired velocity for the airstream entering the power section 6 of the engine assembly 2.

The velocity, pressure and density of the airstream entering the power section 6 is dependent on the actual distance between the normal shock pattern 18 and the leading edge 7 of the engine power section 6. As previously noted, the location of the normal shock pattern 18 may unintentionally change due to changes in ambient flying conditions, aircraft maneuvering, or the like. When this happens, the velocity, pressure and density of the airstream entering the engine power section 6 will also change. Such unintentional power section incoming airstream velocity, pressure and density changes may result in inefficient or even failure of operation of the power section 6. On the other hand, when intentional changes in the mode of flight of the aircraft are made, it may be desirable, or necessary to intentionally change the location of the normal shock pattern 18 to move toward or away from the face 7 of the power section.

It is apparent that either intentional or unintentional movement of the normal shock pattern 18 must first be detected before anything can be accomplished. In the instant invention, detection of the position of the normal shock pattern 18 is achieved with a light beam. The light beam emanates from a light source 20 which is mounted in a side wall of the air inlet section 4. A preferred form of light source 20 is shown in FIG. 2 and includes a single mode narrow frequency emitter such as a laser diode 22. The emitter 22 preferably has a collimating lens 24 which creates a narrow parallel ray collimated light beam 26. The light beam 26 is directed obliquely across the air inlet section 4 toward the desired location of the normal shock pattern 18. The air density changes across the shock pattern 18 will refract and bend the light beam to the path 27. A bank 28 of discrete light collectors 30 is disposed on the side of the air inlet 4 opposite the emitter 20 and downstream of the normal shock pattern 18. FIG. 3 shows details of one of the light collectors 30. Each collector 30 is formed from a transparent light transmitting material, and may be formed with a plurality of convex "lenselets" 32 which receive the rays in the light beam 22 and selectively refract and concentrate them into a fiber optic light pipe 34. The light piping fibers 34 are bundled in a harness 36 which runs to an air inlet controller 38. The controller 38 includes a preprogrammed microprocessor which will be explained in greater detail hereinafter. The individual light pipe fibers 34 are connected to discrete photodetectors 40 which in turn are operably connected to the controller microprocessor. The photodetectors 40 transmit signals to the microprocessor which are indicative of the location of the normal shock pattern 18 relative to the engine power section 6.

In FIG. 1, the broken line 18' denotes a second possible position of the normal shock pattern. This second position could occur unintentionally, or it could be the result of airflow manipulation, as will be described hereinafter. In either case, the beam 26 will be refracted when it passes through the shock pattern 18' to the path 26'. The light provided by altered beam path 26' will be collected by another one of the collectors 30 in the bank 28 thereof. In the latter case, the gathered light will be piped to a different one of the photodetectors 40 which will transmit a differentiated signal to the controller microprocessor which will indicate the different position 18' of the normal shock pattern. As noted, the different position of the normal shock pattern 18' can be unintentional, or could be intentionally created as follows.

Assume that extant flight conditions and flight mode dictate that the normal shock pattern should be moved from position 18 to position 18' for most efficient operation of the engine power section 6. Cockpit or other aircraft controls will signal the air inlet controller 38 that the change should be made whereupon the air inlet controller 38 will cause the ramp 12 to pivot about hinge 14 to position 12' (shown in phantom) thereby moving the impingement surface 13 to position 13'. This will cause the first oblique shock pattern 10 to shift to the position shown by the broken line 10'. At the same time, the second oblique shock pattern 16 will shift to the position represented by the broken line 16'. The aforesaid shifting of the first and second oblique shock patterns will result in a shifting of the normal shock pattern away from the power section 6 to the position represented by the broken line 18'. The shift of the normal shock pattern's position increases the distance between the normal shock pattern and the leading edge 7 of the engine power section 6 from X to X'. This shock pattern shift will change the entry velocity, pressure and density of the airstream flowing into the power section 6. It should be noted that in relatively normal ambient flight conditions, reducing the air inlet area will tend to move the normal shock pattern away from the power section.

The airstream flow control system may also include airstream bleed tabs such as the airstream bypass door 41 which is pivotally mounted on hinge 42. The bypass door 41 can be selectively manipulated by the controller 38 so as to bleed air from the air inlet section 4 along the airflow path defined by the arrow B so as to increase or decrease air pressure, and the airstream velocity between the normal shock pattern and the engine power section 6. Air pressure and airflow velocity variations created by the bleed door 41 will cause the normal shock pattern to move from an existing position to a desired position, either closer to or farther from the power section 6.

Figure 4:
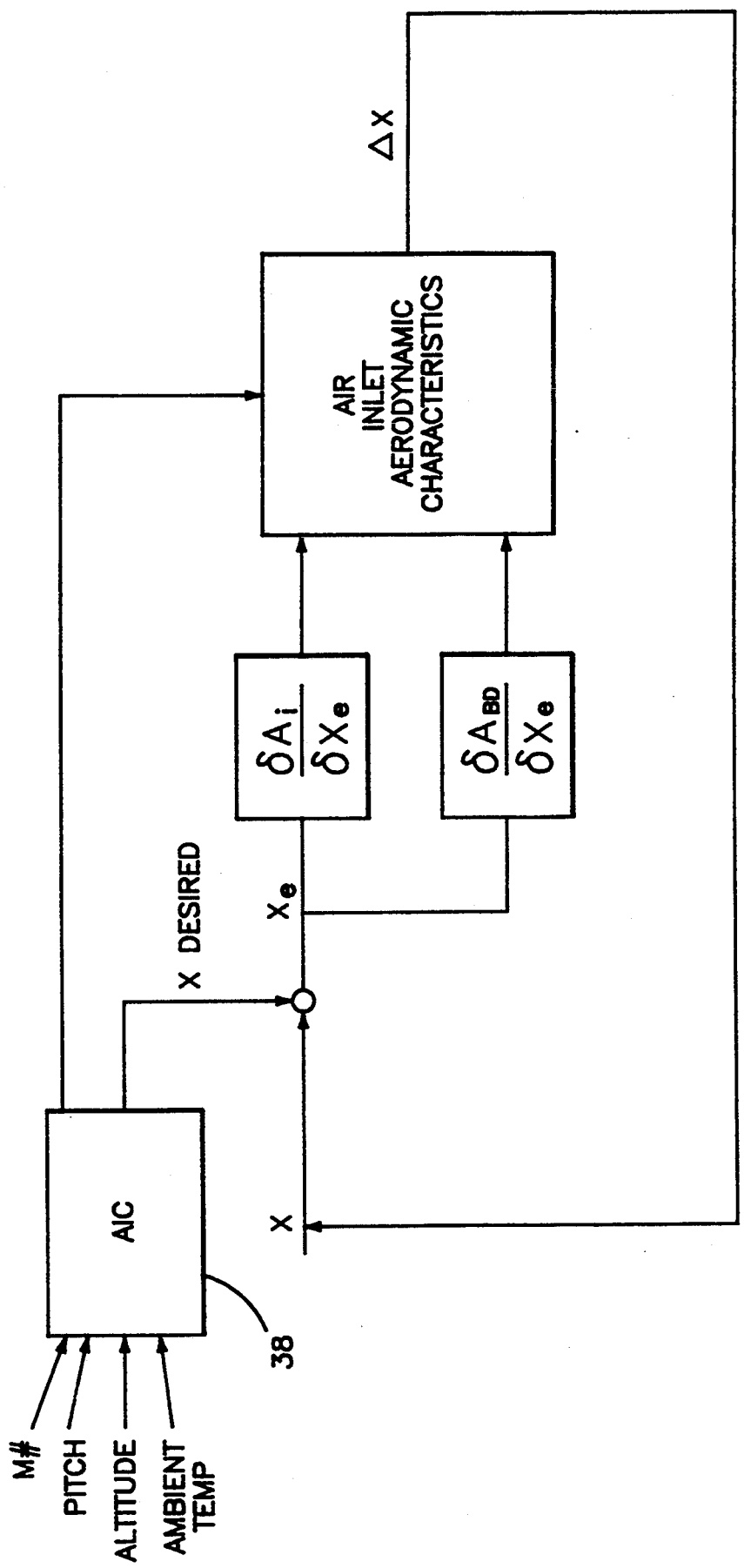
FIG. 4 is a system diagram illustrating the mode of operation of the air inlet controller.

Referring now to FIGS. 4 and 5, the manner of operation of the air inlet controller microprocessor software; and the circuitry for controlling tab deflections are illustrated. FIG. 4 illustrates the preferred manner of operation of the air inlet controller 38. In FIG. 4, the symbols in the drawing are as follows:

"M#" refers to the incoming ambient airstream Mach number;

"Pitch" refers to the aircraft or wing pitch, or angle of attack relative to the oncoming air mass;

"X" is the actual distance between the normal shock pattern and the leading edge of the power section;

"X desired" is the desired distance between the normal shock pattern and the leading edge of the power section;

"Xe" is the difference between "X" and "X desired";

"Ai" is the pitch angle of the inlet ramp;

"$A_{BD}$" is the pitch angle of the bypass door; and

"$\Delta X$" is the change in the distance "X". FIG. 4 indicates that the air inlet controller 38 receives continuous ambient flight parameters such as: Mach speed; aircraft pitch; aircraft altitude; and ambient air temperature. All of these ambient flight parameters will affect the existing location of the normal shock pattern within the air inlet section. The air inlet controller 38, taking into account the incoming ambient flight conditions, establishes "X desired" and compares "X desired" to the extant "X" distance. This comparison establishes the difference "Xe" between "X" and "X desired". The controller 38 then looks at the change in "Ai" and the change in "$A_{BD}$" needed to achieve "X desired", taking into account the sensed ambient flight conditions, i.e., the "inlet aerodynamic characteristics". The "$\Delta X$" (change in the normal shock pattern location, if any) is thus determined, and the controller then takes appropriate action to make the necessary corrections. The monitoring of normal shock pattern location, and comparison thereof to the desired normal shock pattern location is continuous, and any necessary alterations of airflow parameters are performed.

Referring to FIG. 5, a schematic circuit diagram of the tab deflection system is shown. The ramp 12 is selectively pivoted by an actuator 50 operably connected to the air inlet controller 38. The bypass door 41 is selectively pivoted by an actuator 52 which is also operably connected to the controller 38. The actuators 50 and 52 are reversible so as to be able to pivot the ramp 12 and door 41 in both the clockwise and counter clockwise directions about the hinges 14 and 42, respectively.

It will be readily appreciated that the system of this invention can sense, monitor and control the position of the incoming airflow normal shock pattern in a supersonic aircraft jet engine assembly, thereby controlling the entering airflow speed of the airstream into the power section of the engine. The normal shock pattern position can be altered by intentionally changing the geometry of the air inlet section of the engine assembly. Optimum engine operation can therefore be obtained.

Since many changes and variations of the disclosed embodiment of the invention may be made without departing from the inventive concept, it is not intended to limit the invention otherwise than as required by the appended claims.

What is claimed is:

1. An aircraft jet engine assembly comprising:
    a) a power section for utilizing ambient airflow to create thrust;
    b) an air inlet section which receives an ambient airstream and directs the airstream to said power section; and
    c) means for determining the location of a normal shock in the airstream within said air inlet section when the aircraft is in supersonic flight said means for determining comprising a narrow beam energy emitter which directs a narrow linear energy beam obliquely across said air inlet section, said energy beam having a path of travel which is oblique to the plane of the shock and which will be deflected out of its linear course as it passes through the shock within said air inlet section.

2. The jet engine assembly of claim 1 wherein said energy emitter is a light emitter which projects a parallel ray light beam whose path of travel will be refracted by the shock.

3. The jet engine assembly of claim 2 wherein said light emitter is a single mode narrow frequency laser diode.

4. The jet engine assembly of claim 1 further comprising sensor means operable to detect oblique deviations in the path of travel of the energy beam caused by variations in the location of the shock within said air inlet section.

5. The jet engine assembly of claim 4 further comprising means operable to change the geometry of said air inlet section so as to alter the position of the shock within the air inlet section.

6. The jet engine assembly of claim 5 wherein said means operable comprises movable powered tabs in said air inlet section.

7. The jet engine assembly of claim 6 further comprising air inlet controller means operably connected to said sensor means for receiving shock pattern actual position-indicating signals from said sensor means, and operably connected to said powered tabs for controlling the position of said powered tabs in a manner at least partially dependent upon said shock pattern position-indicating signals.

8. An aircraft jet engine assembly comprising:
a) a power section for utilizing ambient airflow to create thrust;
b) an air inlet section which receives an ambient airstream and directs the airstream to said power section;
c) a concentrated narrow light beam emitter for directing a linear light beam obliquely across said air inlet section;
d) sensor means for detecting the location of the light beam in said air inlet section;
e) said emitter and sensor means being operable to detect the location of a normal shock within said air inlet section when the aircraft is in supersonic flight by reason of oblique deviations in the path of travel of the light beam caused by the normal shock, which deviations change as the location of the normal shock changes;
f) powered movable tab means in said air inlet section for changing the geometry of said air inlet section thereby altering ambient airflow patterns through said air inlet section; and
g) air inlet controller means operably connected to said sensor means for receiving actual normal shock position-indicating signals from said sensor means, and operably connected to said powered movable tab means for selectively causing air inlet geometry-altering movement of said tab means, said controller means being operable to selectively move said tab means in response to signals from said sensor means which indicate actual positioning of the normal shock away from a controller-desired position so as to move the normal shock toward the controller-desired position.

9. The jet engine assembly of claim 8 wherein said emitter is a single mode narrow frequency laser diode.

10. The jet engine assembly of claim 8 wherein said air inlet controller is operable to continuously derive the controller-desired position of the normal shock from contemporaneous aircraft condition-indicating signals including: flight mode; Mach number; pitch; altitude; ambient temperature; cockpit; and other aircraft control signals.

* * * * *